Jan. 2, 1968      R. V. HILTON      3,361,170
HAND TOOL WITH TORQUE AUGMENTING MEANS
Filed Aug. 9, 1966
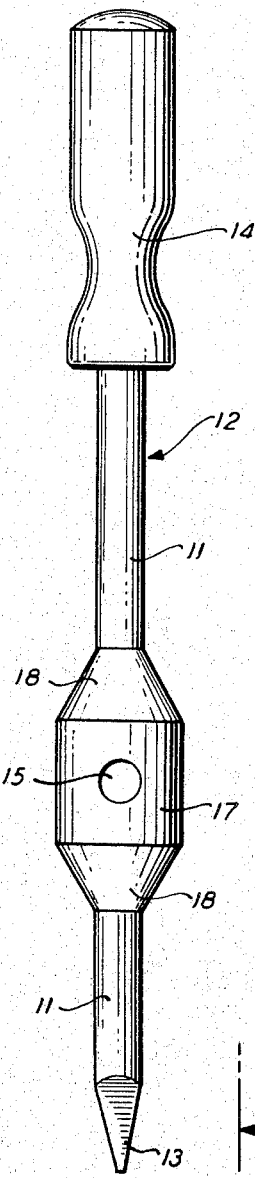
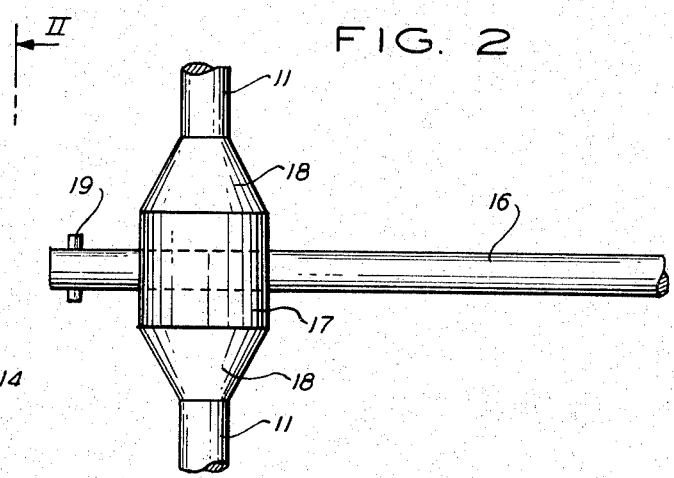
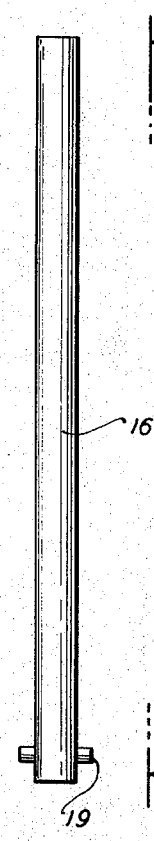
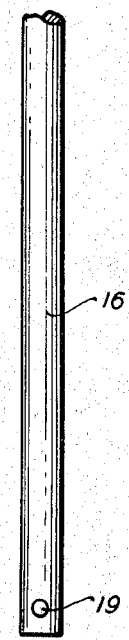
INVENTOR
ROBERT V. HILTON
BY *Towson Price*
ATTORNEY

United States Patent Office 3,361,170
Patented Jan. 2, 1968

3,361,170
HAND TOOL WITH TORQUE AUGMENTING MEANS
Robert V. Hilton, 251 Central Ave.,
West Caldwell, N.J. 07006
Filed Aug. 9, 1966, Ser. No. 571,273
2 Claims. (Cl. 145—65)

ABSTRACT OF THE DISCLOSURE

The provision of a detachable handle or finger piece to extend transversely of the longitudinal axis of a tool to a substantial distance beyond the diameter of its hand grip, to thereby apply a greater turning moment in effecting a rotary movement of the tool.

The present invention relates to a manually-actuated tool of the type adapted to be rotated for turning a screw, nut or the like and the invention more specifically pertains to the structural features of the shank of such tools, whereby means may be employed in association with the tool to increase the torque that may be manually applied to the tool shank.

The blade of a screw driver, auger, or the like is ordinarily provided with a hand grip of enlarged cross-section having preferably a roughened surface in order that the hand, in manually operating the tool, may obtain a firm hold in rotating the blade. In some instances of use such a grip is effective, although in driving a screw or cutting a hole into a close-grained piece of wood or in releasing a rusty nut or in many like instances such a purchase on the hand grip is not sufficiently effective, owing to the fact that the hand grip must fit in the palm of an average hand, and thus the diameter of the hand grip is relatively small, even though enlarged relatively to the diameter of the shank of the tool. The smaller the diameter of the hand grip, the less leverage may be obtained in effecting rotation thereof.

The present invention has for one of its objects the provision of a finger piece extending transversely of the longitudinal axis of the tool outwardly therefrom to a substantial distance beyond the diameter of the hand grip. The grip of the hand on the handle is thereby augmented by a finger grip on the outwardly extending finger piece to obtain a greater leverage in a rotary movement of the tool. Thus, the added leverage effected by the use of the finger piece, together with the usual grip on the handle makes it easier to drive or release a screw or to drill a hole or the like.

One of the objects of this invention is to provide a grip for hand tools, of the character indicated above, which is comparatively inexpensive to manufacture, is simple and efficient in operation, and is durable.

Another object of this invention is to provide a grip for hand tools of the type hereinabove mentioned, in which the tool members have interlocking engagement so that each individual member may be replaced by a like member.

A still further object of this invention is to provide a grip for hand tools of the type noted above wherein the normal grip on the tool handle is augmented by the grip on a finger piece to provide greater leverage.

Another object of the invention is to provide a screw driver attachment, as characterized, which is very simple in construction, economical to manufacture, and which can be readily applied to the screw driver shank, as the occasion may require.

A further object of my invention is to provide a detachable handle capable of being mounted at substantially right angles to the screw driver shank for the purpose of aiding the person using the screw driver in driving large screws into wood, small screws into wood of very close grain, or removing them from such wood, where it is extremely difficult to operate an ordinary screw driver having a handle in line with the shank.

These and other objects and advantages will become apparent from the following detailed description when taken with the accompanying drawings. It will be understood that the drawings are for the purpose of illustration and do not define the scope or limits of the invention, reference being had for the latter purpose to the appended claims.

In the drawings, wherein like reference characters denote like parts in the several views:

FIGURE 1 is an elevational view of a tool embodying my invention.

FIGURE 2 is a fragmentary elevational view of said tool, on line II—II FIGURE 1, in the direction of the arrows, showing in place the torque-augmenting bar of FIGURES 3 and 4.

FIGURE 3 is a separate elevational view of the torque-augmenting bar of FIGURE 2.

FIGURE 4 is a fragmentary elevational view of said bar on the line IV—IV of FIGURE 3, in the direction of the arrows.

Referring to the drawing by reference characters, numeral 11 designates the shank of a tool which may be a screw driver 12, the end of its shank 11 having a usual groove-engaging blade or other work portion 13.

The end of the desirably steel shank 11 opposite the blade 13 is provided with a handle 14 which may be of conventional shape, size, formed of wood, plastic, or other suitable material, and connected to said shank in a usual manner.

It has been found that even if the handle 14 of the tool or screw driver 12 is large, such is not sufficient to manually apply a high torque to screws, or other objects such as nuts to be turned on or off bolts. To overcome such deficiency, I provide the shank 11 with a torque-rod-adapter hole 15 intermediate the handle 14 and blade 13, for the purpose of receiving associated torque-augmenting means, here shown as a torque bar or rod 16, desirably also formed of steel.

In order to avoid weakening the shank 11 to an undesirable extent, I form an enlargement or portion 17 of enlarged cross-section, and make the hole 15 in this enlarged portion. The shank 11 and enlargement 17 are both desirably circular in cross-section or cylindrical. On the opposite sides of the hole 15, the enlargement 17 tapers or is formed frustoconical, as indicated at 18, to gradually merge into the shank portions 11 at opposite ends of said enlargement 17.

In order to prevent the rod or torque bar 16 from accidental detachment from the shank 11, while allowing for free sliding thereof to a convenient location for use, I form one end portion of said rod enlarged, as indicated at 19. In the present embodiment, the enlargement 19 takes the form of a pin, the intermediate portion of which is securely fixed in a transverse aperture in, and near one end of, the bar 16, and the end portions of which protrude, as illustrated in FIGURES 2 and 3, distances sufficient to prevent the bar 16 from being applied to aperture 15, enlarged end first.

In operation, the end of the bar 16, away from the enlargement 19, is placed in the adapter hole or aperture 15 and moved to a position with respect to the tool 12, so as to leave the end portion, remote from the enlargement 19, at a location convenient to be manually grasped for securing the desired leverage with one hand while the handle 14 is held by the other. Undesired movement or removal to the right, as viewed in FIGURE 2, is prevented by the enlargement 19.

If the tool 12 is a screw driver, the blade 13 is inserted in the groove or slot in the head of a screw to be loosened, for example, and while pushing on the handle with one hand the torque bar 16 is turned by the other hand about the axis of the shank 11. It will be found that a large amount of torque may thus be applied to a screw or other workpiece, for applying or removing the same. If it is desired to loosen a nut on a bolt, for example, the part 13 of the shank 11 would be a wrench to fit said nut. Thus a large amount of torque may be manually generated for any such purpose. When the tool 12 is used for work not requiring a high torque, the bar 16 is not used therewith.

Having now described my invention in detail in accordance with the requirements of the patent statutes, those skilled in this art will have no difficulty in making changes and modifications in the individual parts or their relative assembly in order to meet specific requirements of conditions. Such changes and modifications may be made without departing from the scope and spirit of the invention, as set forth in the following claims.

I claim:
1. In a tool, a handle, a generally cylindrical shank extending therefrom, connected directly thereto and terminating in a work portion, wherein a part of the shank between said handle and work portion is cylindrical and larger in cross-section than parts at either end thereof, the shank merges into said enlargement along frusto-conical portions, and an aperture in and extending traverse to said enlargement for receiving a torque bar without undesired weakening of said shank, while allowing for free sliding therein of said bar to a convenient location, for applying torque with one hand while the handle is without interference held in the other hand.

2. In a tool as recited in claim 1, wherein the torque bar is fitted and freely slidable in said aperture, an enlargement on said bar near one end thereof, formed by a pin extending transverse to said bar, of a size to prevent said enlargement from being inserted or withdrawn through said aperture, and the work portion is a part cooperable with a member to be turned.

References Cited

UNITED STATES PATENTS

| | | | |
|---|---|---|---|
| 1,683,384 | 9/1928 | Durham et al. | 81—177 |
| 2,241,965 | 5/1941 | Sjobring | 145—65 |

MILTON S. MEHR, *Primary Examiner.*